April 14, 1970 J. P. ANDERSON ET AL 3,505,887

OVERTRAVEL MECHANISM

Filed Sept. 30, 1968

INVENTORS
JOHN P. ANDERSON
BY MYRL E. ORME

*Robert C. Smith*

ATTORNEY

United States Patent Office 3,505,887
Patented Apr. 14, 1970

3,505,887
OVERTRAVEL MECHANISM
John P. Anderson, Encino, Calif., and Myrl E. Orme, Normandy Park, Wash., assignors to The Bendix Corporation, a corporation of Delaware
Filed Sept. 30, 1968, Ser. No. 763,901
Int. Cl. F16h 21/02
U.S. Cl. 74—89                                    7 Claims

ABSTRACT OF THE DISCLOSURE

A mechanism is described for permitting a large angular travel in an input member to be converted to a very short linear translation of an output member. An input shaft is supported in a housing parallel with an intermediate shaft, with the said shafts carrying interlinking lever structures. The intermediate shaft carries a lever with a channel therethrough, and a block is slidable in the channel and pinned to the input shaft lever near its end such that when the input shaft is centered, the pin is located near the axis of rotation of the intermediate shaft. A second pin is carried in said intermediate shaft slightly displaced from its axis, and this pin drives an output member, whereby over a first range of movement of the input shaft movement of said output member is approximately linearly related to movement of the input shaft, over a second range movement of said output member becomes progressively less, and over a third range of movement of said input shaft said output member begins moving in the opposite direction.

BACKGROUND OF THE INVENTION

This invention pertains to a mechanism for converting an input signal of large angular travel into an output signal of very limited linear travel. It is common practice today to design control means for control surfaces on aircraft wherein a mechanical input from a pilot is supplied to a hydraulic servo valve, and this valve, in turn, controls the operation of a hydraulic actuator which supplies a shaft output with great force and substantial travel to operate the control mechanism. In order to prevent over-controlling of the control surfaces and related problems with stability, it is frequently necessary to employ feedback means to the servo valve. Such servo valves are often controlled by electrohydraulic servo motors or torque motors and include slide valves or spool valves having very limited travel, such as 0.2 inch maximum. Since the output from the controlled actuator will normally involve substantial travel, the signal available for feedback also has substantial travel. Consequently the large travel must be converted into a much shorter travel or, alternatively, a very large length servo valve must be used to accommodate this input. Since weight and size requirements normally preclude this latter choice, it becomes necessary to provide an overtravel mechanism to prevent this large travel input from the feedback mechanism overdriving the servo valve which results in causing the pilot or automatic input mechanism to sense a jammed condition with further input resulting in undue forces being applied to the structure. Since the typical servo arrangement is designed to provide a realistic control "feel" for the pilot or operator, this make it necessary that the feedback portion of the control unit not exert undue load feedback or "kickback" to the pilot as the control unit approaches its ordered position.

While a number of mechanisms are known and have been proposed for this purpose, applicants found that the device described herein meets the above requirements admirably in that it eliminates any kickback which may be mistaken for a jammed condition while permitting a very small or short-stroke valve. It does not interfere with the proper or desired feel to the pilot, is extremely simple and compact, and avoids the imposition of undue forces into the structure.

SUMMARY

The overtravel mechanism described in the present application utilizes a rotatable input shaft supported on bearings in a housing with a lever attached to the input shaft. Also supported within the housing is a second shaft which rotates about an axis parallel to the axis of the input shaft and which has a lever interlinking the lever of the first shaft with a channel therethrough. Positioned in the channel is a sliding block which is pinned at the outer end of the input shaft lever. The hollow lever forming part of the second shaft includes slots for permitting the pin to move relative to said lever, so that as the input lever is rotated around its axis this pin is also caused to rotate around the same axis, thereby causing the second lever to be rotated around its axis of rotation which is only slightly displaced from the center position of the pin. The rotated lever includes a bore parallel to and displaced slightly from its axis of rotation and also a transverse groove or slot with a second pin extending across the slot in said bore. An output member is carried in the slot and moves in response to the movement of this second pin.

As the input shaft rotates the first few degrees, the pin in the sliding block is translated such as to cause a very large rotation of the second lever, but this rotation reaches a maximum amount in the first few degrees, and further movement of this pin in response to rotation of the input shaft actually causes the second lever to be rotated partially in a direction toward its original position. Since the second pin is located to rotate around the axis of the second lever, this pin will also experience a relatively large angular rotation in the first few degrees of movement of the input shaft, quickly reaching a maximum displacement and then gradually moving back toward its initial position. Since its displacement from the axis of rotation of the second shaft is very limited, it can impart only a very limited maximum travel to the output shaft.

DESCRIPTION OF THE PREFERRED EMBODIMENT

Figure 1:
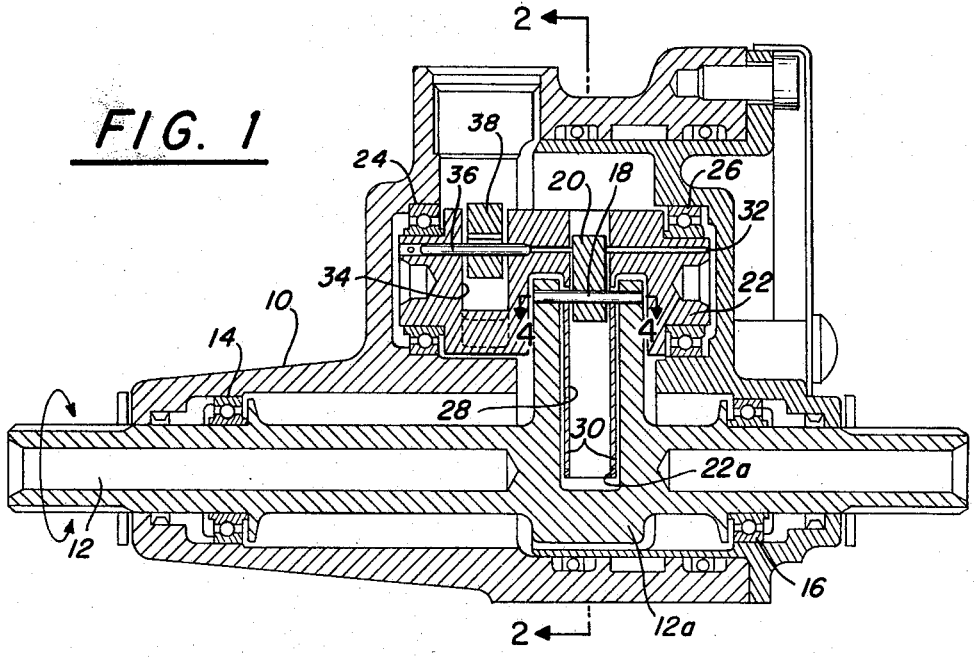
FIGURE 1 is a sectional view of an overtravel mechanism incorporating our invention.
Figure 4:
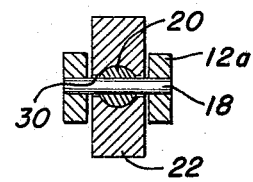
FIGURE 4 is a sectional view taken along line 4—4 of FIGURE 1.

Referring now to FIGURE 1, an exterior housing is shown at numeral 10, and this housing includes an input shaft 12 supported by a pair of ball bearing members 14, 16. Shaft 12 includes a bifurcated lever structure 12a positioned between the bearings 14 and 16. Bridging the portions of lever structure 12a is a pin 18 which, in addition to passing through ports in lever 12a, also passes through a bore in a cylindrical block member 20. Interacting with the input shaft 12 is a second or intermediate shaft 22 which is supported parallel to shaft 12 in housing 10 by means of a pair of bearings 24, 26. Forming part of shaft 22 and positioned between the bearings 24 and 26 is a hollow lever structure 22a which contains a cylindrical slide passage 28 within which the block 20 is translated. It will be observed that pin 18 which attaches lever structure 12a to block 20 is slidable within slots 30 formed in the side wall of lever structure 22a (see FIGURES 2 and 4).

Shaft 22 also includes a bore 32 drilled parallel to its axis, but displaced therefrom, as well as a channel or groove 34 which is cut transversely across shaft 22 and across bore 32. A pin 36 is disposed in bore 32 in such manner as to bridge the channel or groove 34. Positioned in the groove 34 and carried on pin 36 is an output member 38 which is translated in response to rotation of the intermediate shaft 22.

Figure 2:
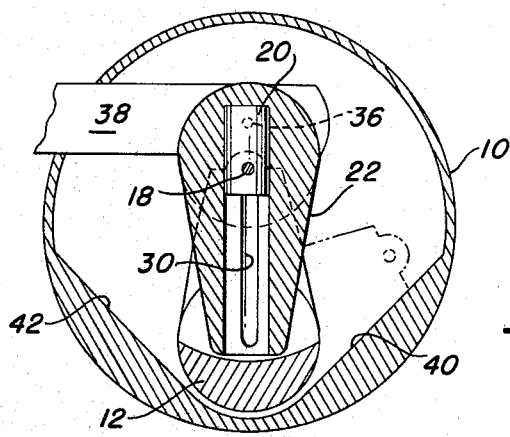
FIGURE 2 is a sectional view taken along line 2—2 of FIGURE 1.
Figure 3:
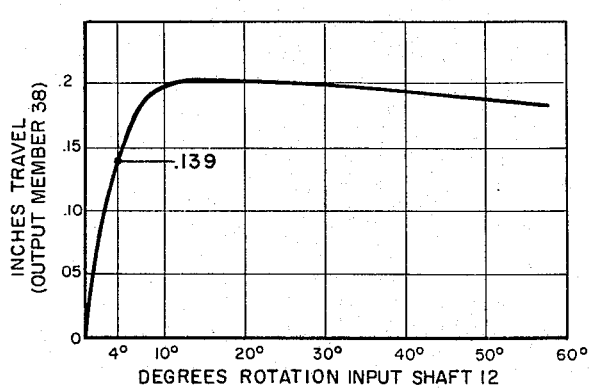
FIGURE 3 is a graph showing the input versus output characteristics of the device shown in FIGURES 1 and 2.

Operation of the device thus far described may be better understood from examination of FIGURE 2 in association with FIGURE 1 and also from examination of FIGURE 3, which shows the input versus output characteristics of the device. Input shaft 12 is rotatable about its axis in a first direction until it abuts against a stop 40 forming part of housing 10 and in a second direction until it abuts against a similar stop 42. Lever section 12a is shown in dashed outline against stop 40. Since pin 18 is firmly fastened to lever section 12a, it must follow the travel of 12a, and as it does so, it carries with it the slidable block 20 which slides in channel 28 forming part of the lever 22a. Pin 18, of course, slides in slots 30. Since pin 18 is located only a very small distance from the axis of rotation of shaft 22, a small rotation of the input shaft 12 from its centered position, as shown, will result in a very large angular rotation of the intermediate lever 22a. As the input lever 12a is rotated further, a point is reached at which the intermediate lever 22 no longer moves substantially in response to movement of the input lever 12a, and further movement of the input lever causes a slight movement of the intermediate lever 22a in the reverse direction. As shaft 22 rotates, it carries with it the pin 36 which is located a small distance from the axis of rotation of shaft 22. Because of its limited distance from the axis of rotation, the travel of pin 36 is very limited, and it can therefore impart only limited movement to the output member 38.

This characteristic is shown more clearly by reference to FIGURE 3, which is a graph showing the input versus output characteristics of the device shown in FIGURES 1 and 2. Plotted along the abscissa are degrees of rotation of the input shaft 12, and on the ordinate is plotted travel of the output member 38. As is apparent from this graph, rotation of the input shaft 12 through a very limited number of degrees produces almost the maximum translation of the output member 38. Further rotation causes the output member to move less and less per degree of input until it stops moving altogether. Over a third range of movement, further rotation of the input member causes the output member to actually move in the opposite direction from its initial input by some small amount. It will be appreciated that the characteristic of this curve is essentially the same for each of the two possible directions of rotation of the input shaft from its dead center position, as illustrated in FIGURES 1 and 2.

While only one embodiment is shown and described herein, it will be apparent to those skilled in the art that numerous modifications may be made without departing from the scope and spirit of the present invention. For instance, rather significant changes in the input versus output characteristic may be effected through judicious control of the effective lever arm of member 12a and the effective lever arm acting between the axis of member 22 and pins 18 and 36.

We claim:

1. An overtravel mechanism comprising a housing structure;
first and second bearing means in said housing structure;
an input shaft carried in the first said bearing means, said shaft including a lever movable between stop means in said housing and a first pin fastened to the outside end of said lever at a distance from the axis of said shaft;
an intermediate shaft carried in the second said bearing means, said intermediate shaft including a second lever, a channel in said second lever, and a groove perpendicular to the axis of said shaft;
a block slidable in said channel fastened to said first pin and to said first lever and positioned within said channel such that when said first lever is positioned midway between said stops, said first pin is closest to the axis of rotation of said intermediate shaft and only slightly displaced therefrom;
a second pin carried in said intermediate shaft parallel to its axis and displaced therefrom a distance slightly greater than said first pin when closest to said axis and spanning said groove;
and an output member movable in said groove and carried on said second pin;
whereby over a first range of movement of said input shaft, movement of said output member is approximately linearly related to the input movement, over a second range movement of said output member becomes progressively less, and over a third range of movement of said input member, said output shaft begins moving in the opposite direction.

2. An overtravel mechanism as set forth in claim 1 wherein, in response to rotation of said input shaft over a first range, movement of said output member is approximately linearly related to movement of said input shaft; over a second range movement of said output member becomes progressively less, and over a third range of movement of said input shaft, said output member begins moving in the opposite direction.

3. An overtravel mechanism as set forth in claim 1 wherein rotation of said input shaft over a range of approximately sixty degrees results in a maximum linear travel of said output member less than 0.15 inch.

4. An overtravel mechanism comprising:
support means including stop means;
an input shaft carried in said support means and a first lever carried on said input shaft;
an intermediate shaft carried in said support means substantially parallel to said input shaft and including an elongated lever having a channel therein;
a block slidable in said channel and a pin attaching said block to said first lever near its outside end such that when said first lever is centered between said stop means said pin is only slightly displaced from the axis of said intermediate shaft and parallel thereto;
a bore in said intermediate shaft parallel to its axis and slightly displaced therefrom;
a groove in said intermediate shaft essentially perpendicular to said bore;
a second pin in said bore spanning said groove; and
an output member in said groove and movable in response to movement of said second pin.

5. An overtravel mechanism as set forth in claim 4 wherein said elongated lever includes slots through which said first named pin travels as said intermediate lever is moved in response to movement of said first lever.

6. An overtravel mechanism as set forth in claim 4 wherein said support means includes a housing and bearings in said housing for supporting said intermediate and input shafts.

7. An overtravel mechanism comprising:
support means including stop means;
an input shaft carried in said support means and a first lever carried on said input shaft;
an intermediate shaft carried in said support means substantially parallel to said input shaft and including an elongated lever having a channel therein;
a block slidable in said channel and a pin attaching said block to said first lever near its outside end such that when said first lever is centered between said stop means said pin is only slightly displaced from the axis of said intermediate shaft and parallel thereto;

and output means attached to said intermediate shaft at a limited distance from the axis thereof.

References Cited

UNITED STATES PATENTS

| | | | |
|---|---|---|---|
| 1,595,917 | 8/1926 | Owen | 74—44 |
| 2,704,947 | 3/1955 | Hopkins | 74—89 |
| 3,421,379 | 1/1969 | Carroll | 74—89 |

MILTON KAUFMAN, Primary Examiner

W. S. RATLIFF, JR., Assistant Examiner